United States Patent [19]

Kasuga et al.

[11] 4,091,158

[45] May 23, 1978

[54] MAGNETIC RECORDING MEMBERS

[75] Inventors: Akira Kasuga; Goro Akashi; Osamu Suzuki, all of Odawara, Japan

[73] Assignee: Fuji Photo Film Co., Ltd., Minami-ashigara, Japan

[21] Appl. No.: 676,177

[22] Filed: Apr. 12, 1976

[30] Foreign Application Priority Data

Apr. 11, 1975 Japan ................................ 50-44017

[51] Int. Cl.² .......................... B32B 7/02; G11B 5/74
[52] U.S. Cl. ................................. 428/216; 360/134; 427/131; 428/329; 428/336; 428/900
[58] Field of Search .............. 428/212, 213, 215, 216, 428/332, 334, 335, 336, 339, 900, 323, 328, 329; 427/127, 131, 132, 180, 201–203, 205, 248, 250; 360/134

[56] References Cited

U.S. PATENT DOCUMENTS

| 2,643,130 | 6/1953 | Kornei ................................ 360/131 |
| 2,941,901 | 6/1960 | Prill et al. ........................ 428/900 X |
| 3,676,217 | 7/1972 | Akashi et al. ....................... 360/134 |
| 3,761,311 | 9/1973 | Perrington et al. ................. 360/134 |
| 3,775,178 | 11/1973 | Perrington et al. ................. 360/134 |

FOREIGN PATENT DOCUMENTS

| 1,909,155 | 7/1973 | Germany ............................. 428/900 |
| 2,507,975 | 9/1975 | Germany ............................. 427/131 |
| 1,153,453 | 5/1969 | United Kingdom ................. 427/131 |

Primary Examiner—Thomas J. Herbert, Jr.
Assistant Examiner—Bruce H. Hess
Attorney, Agent, or Firm—Sughrue, Rothwell, Mion, Zinn and Macpeak

[57] ABSTRACT

A magnetic recording member comprising a non-magnetic support and two or more magnetic layers provided on the non-magnetic support and composed mainly of a ferromagnetic fine powder and a binder. The upper layer of the magnetic layers has a dry thickness of about 0.3 to about 2.5 μm and the ferromagnetic fine powder contained in the upper layer is ferromagnetic iron oxide having an APP value of not more than about 1.0 and a coercive force of about 300 to about 500 Oe.

7 Claims, 4 Drawing Figures

MAGNETIC RECORDING MEMBERS

BACKGROUND OF THE INVENTION

1. Field of the Invention

The present invention relates to a magnetic recording member, more particularly, to a magnetic recording member with two or more magnetic layers provided on the surface of the support thereof.

2. Description of the Prior Art

Recently, in both open reel and cassette tapes the quality of magnetic recording tape has increased and an increase in the density thereof has been demanded; thus, multi-layer tapes, i.e., magnetic tapes provided with two or more magnetic layers, have been proposed.

Such magnetic tapes are described in, for example, Japanese Patent Publications No. 2218/1962, 23678/1964, Japanese Patents (Laid Open) No. 31602/1972 (U.S. Pat. No. 3,761,311), 37903/1972, 31907/1973 (U.S. Pat. No. 3,775,178), 31804/1975, U.S. Pat. Nos. 2,643,130, 2,647,954, 2,941,901, 3,676,217, German Pat. (DT-AS) Nos. 1,190,985, 1,238,072, etc.

In this case, setting of operating bias is one consideration which should be taken into account, and the set points are in the vicinity of 100%, which is generally called the standard bias. Magnetic tapes meeting these conditions are, in general, most widely used and can be used with ease, and moreover they have the advantage that no special bias setting and equalization are needed.

The most convenient method of producing magnetic tapes of high density is to increase the coercive force of the magnetic iron oxide used in the magnetic tapes. This method, however, has the disadvantage that since the magnetic tape produced by this method is not compatible with the standard bias, it is required that the user select a suitable operating bias and equalization for the magnetic tape so that the best magnetic tape characteristics be obtained, leading to confusion on the part of the user with respect to standard bias, chromium dioxide bias, and multilayer bias in selection of the correct bias and equalization. Furthermore, it is difficult to use such magnetic tapes interchangeably in various tape recorders, tape decks and the like, since such magnetic tapes require a certain bias and equalization range, which may not be found in certain tape decks. Although conventional two layer tapes have improved output in the low region, they need special operating bias and equalization positions as is shown in Table 1.

Table 1

| Kind of Magnetic Tape | Bias (%)*[1] | Equalization ($\mu$ sec*[2]) |
|---|---|---|
| Low Noise Type | 100 | 120 |
| Fe-Cr Type*[3] | 130 | 35 to 50 |
| $CrO_2$ Type | 160 | 70 |

*[1]Indicated with Low Noise Type as basis (100%).
*[2]Indicated with time constant ($\mu$ sec) of equalization of Low Noise Type as the basis (120 $\mu$ sec). In the case of the Fe-Cr Type, it is generally 40 to 60% of the basis, and in the case of $CrO_2$ Type, it is generally 50 to 70% of the basis based on low noise type.
*[3]DUAD Ferri-Chrome Tape (trade name, produced by Sony Corp.) in which the upper layer comprises $CrO_2$ and the lower layer comprises maghemite, Scotch CLASSIC Cassette (trade name, produced by 3 M Co., Ltd.), etc., are typical.

Therefore, unless tape recorders, tape decks, and the like are provided with bias and equalization positions as shown in Table 1, it is impossible to use magnetic tapes under the best conditions. Furthermore, it is necessary to select tape recorders, tape decks, and the like depending upon magnetic tapes of various companies. In this way, the major drawback of the above magnetic tapes is their lack of interchangeability.

The present invention provides magnetic tapes which remove the above described drawbacks involved in selecting an appropriate operating bias and equalization, etc., which can be used interchangeably in conventional tape recorders, tape decks, and the like, and which have excellent properties, and thus the present invention is concerned with magnetic tapes provided with two or more magnetic layers on the surface of the support thereof.

SUMMARY OF THE INVENTION

An object of the present invention is to provide magnetic recording members which although carrying two or more magnetic layers, are close to standard tape* and low noise tape in operating bias and equalization, and which are usable in tape recorders, tape decks, and the like equipped with no bias and equalizer selector.
* QP-12 (trade name, produced BASFA.G.)

Another object of the present invention is to provide magnetic recording members which cause low head demagnetization and low head abrasion.

A further object of the present invention is to provide magnetic recording members which are excellent in distortion, MOL (maximum output level, maximum out-put with no distortion), etc.

As a result of the inventors' research on magnetic tapes which are provided with two or more magnetic layers and are usable with the standard bias and equalization generally used, it has now been found that the above objects are attained by using, as the magnetic substance contained in the upper magnetic layer, ferromagnetic iron oxide having an average pore number, i.e., average number of pores present in a magnetic particle when observed with an electron microscope of high magnifying power (herein called the APP, Average Pore Population) value of not more than about 1.0, and having a coercive force of about 300 to about 500 Oe, and by setting the dry thickness of the upper magnetic layer at about 0.3 to about 2.5 $\mu$m.

DETAILED DESCRIPTION OF THE INVENTION

The present invention provides magnetic recording members comprising a non-magnetic support and two or more magnetic layers provided on the non-magnetic support and comprising a ferromagnetic powder and a binder, in which the dry thickness of the upper magnetic layer is about 0.3 to about 2.5 $\mu$m and the ferromagnetic fine powder contained in the upper magnetic layer is ferromagnetic iron oxide having an APP value of not more than about 1.0 and a coercive force of about 300 to about 500 Oe.

In the case of a three layer magnetic recording member formed in accordance with the present invention on a non-magnetic support, certain highly preferred characteristics have been discovered for the three layers, which will now be described. Firstly, the dry thickness of the layer adjacent to the support is preferably about 3 to about 15 μm, this layer exhibits an APP value of about 5 to about 10 and an Hc value of about 200 to about 400 Oe, more preferably 250 to 300 Oe. The "intermediate" or second layer preferably exhibits a dry thickness of about 0.3 to about 2.5 μm, an APP value of not more than about 1.0 and an Hc value of from about 300 to about 500 Oe. Finally, the outer layer most preferably exhibits a dry thickness of about 0.3 to about 2.5 μm, an APP value of not more than about 1.0, preferably 0.3 to 1.0, and an Hc value of from about 390 to about 600 Oe.

It is thus seen that in the three layer embodiment, the middle and outermost layers both have an APP value of at most about 1.0 and an Hc value which is 30% higher than the layer adjacent the support.

Where there are pores in a uniformly magnetized magnetic substance, the magnetic field caused by these pores results in a reduction in the coercive force (Hc) of the magnetic substance. (See, for example, "Physics of Ferromagnetism" *Butsurigaku Sensho* 4, *Kyozisheitai no Butsuri*, 4th Ed., published by Syoka Do, Aug. 1, 1965). Thus, the APP value is an importanct factor in determining the Hc. Thus, although the APP value varies depending the acicular ratio, etc., of the magnetic particle, an increase in Hc of about 30 to about 50 Oe is observed by reducing the number of pores per particle by one.

The term "APP value" is an abbreviation of Average Pore Population value and defines the number of pores per magnetic particle. The APP value is determined by first measuring the number of pores by observing 20 particles (average particle size is about 0.1 to 1 μm, preferably 0.2 to 0.6 μm; average acicular ratio of 5:1 to 15:1) by means of an electron microscope (50,000 X magnification) and then averaging the values obtained.

Figure 1:
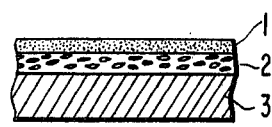
FIG. 1 is an enlarged cross-sectional view showing the layer construction of a multi-layer magnetic recording member.
Figure 2:
FIG. 2 is an enlarged cross-sectional view of a ferromagnetic fine powder.

The structure of a ferromagnetic fine powder containing pores is shown in FIG. 2, in which 4 is a pore and 5 is a ferromagnetic fine powder.

Ferromagnetic powders as are used herein are ferromagnetic iron oxides having an x value in the range of $1.33 \leq x \leq 1.5$ when indicated by the formula $FeO_x$, i.e., maghemite ($\delta\text{-}Fe_2O_3$, $x=1.50$), magnetite ($Fe_3O_4$, $x=1.33$), and Berthollide compounds thereof ($FeO_x$, $1.33 < x < 1.50$).

The above x value is shown by the equation:

$$X = (1/200)\{2(\text{atomic \% of divalent iron}) + 3 (\text{atomic \% of trivalent iron})\}$$

In the above formula, if only trivalent iron is present, then x is 1.50, for example, this is the situation when one has $\delta\text{-}Fe_2O_3$. On the other hand, assuming that one has 33.3% divalent iron and 66.6% trivalent iron, x is equal to 1.33. Accordingly, divalent iron can generally range from 0 to 33.3% while trivalent iron can be present in an amount of from 66.6% to 100%.

To these ferromagnetic iron oxides there may be added divalent metals. Such divalent metals include Cr, Mn, Co, Ni, Cu, etc.; they are added in an amount of 0 to 10 atomic percent based on the iron oxide.

Methods of producing such ferromagnetic Berthollide iron oxides is described in Japanese Patent Publications Nos. 5009/1964, 10307/1964, 39639/1973, etc. The methods described in these patents may be applied to the ferromagnetic iron oxides described in Japanese Patent Publications Nos. 5515/1961, 4825/1962, 6538/1966, 6113/1967, 20381/1967, 14090/1969, 14934/1970, 18372/1970, 28466/1971, 21212/1972, 27719/1972, 39477/1972, 40758/1972, 22269/1973, 22270/1973, 22915/1973, 27200/1973, 44040/1973 and 15757/1974, Japanese Patents (Laid Open) Nos. 22707/1972, 8496/1974, 4199/1974, 41299/1974 (German Pat. No. (OLS) 2,221,264), 41300/1974 (German Patent (OLS) No. 2,221,218), 69588/1974 (German Patent No. (OLS) 2,243,231), West German Pat. No. (OLS) 2,022,013, U.S. Pat. Nos. 3,075,919, 3,389,014, etc.

The APP values of the above ferromagnetic iron oxides are generally about 5 to 10. To reduce this APP value, it is necessary to carefully heat treat these ferromagnetic iron oxides at high temperatures. In this way, ferromagnetic iron oxides having a low APP value, i.e., having fewer pores, are obtained. This heat treatment is conducted in nitrogen gas or a reducing gas (such as hydrogen, town gas, carbon monoxide, etc.) under the conditions: a temperature of about 200 to about 800° C, preferably 350° to 550° C; a pressure of about 1 atm., preferably 1 to 1.5 atm.; a treating time of about 0.5 to about 10 hours, preferably 1 to 6 hours. However, in the case of maghemite ($\delta\text{-}Fe_2O_3$), the above temperature must be at most 500° C.

The APP value of the ferromagnetic iron oxide contained in the upper magnetic layer of the present invention is not more than about 1.0, preferably 0.3 to 1.0, and the coercive force (Hc) of the ferromagnetic iron oxide is about 300 to about 500 Oe, preferably 330 to 450 Oe. The dry thickness of the upper layer is preferably 0.3 to 2.5 μm.

The magnetic layer of the magnetic recording member of the present invention comprises at least two layers, i.e., between the upper layer as described and the support there is provided at least one magnetic layer (lower layer).

The dry thickness of the lower layer is preferably about 3 to about 15 μm, and the APP value of the ferromagnetic iron oxide contained in the lower layer is, preferably about 5 to about 10 and the coercive force (Hc) of the ferromagnetic iron oxide is preferably about 200 to about 400 Oe, most preferably 250 to 350 Oe.

The ferromagnetic recording member of the present invention is produced by coating the lower magnetic layer on the non-magnetic support and drying, and then by providing the upper magnetic layer on the lower magnetic layer in the same coating and drying as used above. It is to be noted in this regard that the lower magnetic layer or lowermost magnetic layer is formed from conventional ferromagnetic iron oxides, and there is no substantial limitation upon the selection of the ferromagnetic iron oxide used in the lower or lowermost magnetic layer, though in the case of a 3-layer magnetic recording member the lowermost magnetic layer most preferably has the characteristics heretofore described.

The following disclosure applies with equal force to any magnetic layer which is formed in accordance with the present invention, i.e., the following disclosure prior to the Examples is of a background nature.

Methods of producing magnetic coating compositions as can be used in the present invention are described in detail in Japanese Patent Publications Nos. 15/1970, 26794/1964, 186/1968, 28043/1972, 28045/1972, 28046/1972, 28048/1972, 31445/1972, 11162/1973, 21331/1973 and 33683/1973, Russian Pat. No. 308,033, etc. The magnetic coating compositions described in these patents are mainly composed of a ferromagnetic powder, a binder, and a coating solvent, though in some cases, if desired, the magnetic coating composition further contains additives such as a dispersing agents, lubricants, abrasives, antistatic agents, and the like.

As binders used in the present invention, known thermoplastic resins, thermosetting resins, and reactive-type resins and mixtures thereof can be used. As one skilled in the art will appreciate, reactive-type resins can be thermosetting but also may be reacted with a thermoplastic resin; further, reactive type resins can be heated to accelerate the reaction thereof. Generally speaking, reactive resins are considered by the art as a type of thermosetting resin, and such interpretation will be used in this application, though it should be appreciated that these terms are not completely synonymous.

Thermoplastic resins are resins having a softening point of not more than about 150° C, an average molecular weight of about 10,000 to about 200,000, and a degree of polymerization of about 200 to about 2,000. For instance, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, an urethane elastmer, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, nitrocellulose, and the like), a styrene-butadiene copolymer, polyester resins, a chlorovinyl ether-acrylate copolymer, amino resins, various synthetic rubber based thermoplastic resins such as isoprene, chloroprene, neoprene, etc., and mixtures thereof can be used.

Such resins are described in Japanese Patent Publications Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, in U.S. Pat. Nos. 3,144,352, 3,419,420, 3,499,798, 3,713,887, etc.

Thermosetting resins or reactive-type resins are resins having a molecular weight of not more than about 200,000 as a coating solution thereof, but after coating and drying their molecular weights become substantially infinite due to reactions such as condensation, addition, and the like. Among these resins, those resins which do not soften or melt before decomposition are preferred. For instance, a phenol resin, an epoxy resin, a polyurethane hardening type resin, an urea resin, a melamine resin, an alkyd resin, a silicone resin, an acryl based reactive resion, a mixture of a high molecular weight polyester resin and an isocyanate prepolymer, a mixture of a methacrylic acid salt copolymer and a diisocyanate prepolymer, a mixture of polyester polyol and polyisocyanate, an urea-formaldehyde resin, a mixture of low molecular weight glycol/high molecular weight diol/triphenylmethane triisocyanate, a polyamine resin, and mixtures thereof, etc., can be used.

Such resins are described in Japanese Patent Publications Nos. 8103/1964, 9779/1965, 7192/1966, 8016/1966, 14275/1966, 18179/1968, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, in U.S. Patents 3,144,353, 3,320,090, 3,437,510, 3,597,273, 3,781,210, 3,781,211, etc.

These binders can be used singly or in combination with each other, and other additives may be added thereto. The binder is preferably used in an amount of about 10 to about 400 parts by weight per 100 parts by weight of the ferromagnetic powder, more preferably in an amount of 30 to 200 parts by weight, same basis.

In the magnetic recording layer there may be present, in addition to the above binder and ferromagnetic fine powder, if desired, a dispersing agent, a lubricant, an abrasive, and anti-static agent, and the like as additives.

Exemplary dispersing agents include fatty acids containing 12 to 18 carbon atoms (e.g., having the formula $R_1COOH$ wherein $R_1$ is an alkyl group containing 11 to 17 carbon atoms), e.g., caprylic acid, capric acid, lauric acid, myristic acid, palmitic acid, stearic acid, oleic acid, eladic acid, linolic acid, linolenic acid, stearolic acid, and the like; metallic soaps comprising the alkali metal (Li, Na, K, etc.) salts or the alkaline earth metal (Mg, Ca, Ba) salts of the above fatty acids; and lecithin, etc. In addition, higher alcohols containing 12 or more carbon atoms and the sulfuric acid esters thereof can be used. The dispersing agent(s) is usually added in an amount of about 1 to about 20 parts by weight per 100 parts by weight of the binder.

Such dispersing agents are described in Japanese Patent Publications 28369/1964, 17945/1969, 15001/1973, in U.S. Pat. Nos. 3,387,993, 3,470,021, etc.

Examplary lubricants include silicone oil, graphite, carbon black, carbon/black graphite graft polymers, molybdenum disulfide, tungsten disulfide, fatty acid esters produced from a monobasic fatty acid containing 12 to 16 carbon atoms and a monohydric alcohol containing 3 to 12 carbon atoms, fatty acid esters produced from a monobasic fatty acid containing 17 or more carbon atoms and a monohydric alcohol, in which the total number of carbon atoms ranges from 21 to 23, and the like can be used. The lubricant(s) is generally added in an amount of about 0.2 to about 20 parts by weight per 100 parts by weight of the binder.

Such lubricants are described in Japanese Patent Publication No. 23889/1968, Japanese Patent Applications Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, *IBM Technical Disclosure Bulletin,* Vol. 9, No. 7, page 779 (December, 1966), ELEKTRONIK, No. 12, page 380 (1961), etc.

Typical abrasive agents include conventionally used materials, e.g., fused alumina, silicon carbide, chromium oxide, corundum, synthetic corundum, diamond, synthetic diamond, garnet, emery (main components: corundum and magnetite), and the like. Those abrasives are used which have a Mohs hardness of not less than about 5 and an average particle size of about 0.05 to about 5 $\mu$, preferably 0.1 to 2 $\mu$. The abrasive is generally added in an amount of about 7 to about 20 parts by weight per 100 parts by weight of the binder.

Such abrasives are described in Japanese Patent Application No. 26749/1973, U.S. Pat. Nos. 3,007,807, 3,041,196, 3,293,066, 3,630,910, 3,687,725, British Pat. No. 1,145,349, West German Pat. No. 853,211, etc.

Suitable antistatic agents include electrically conductive powders, e.g., graphite, carbon black, carbon black graft polymers, and the like; natural surface active agents, e.g., saponin, and the like; nonionic surface active agents, e.g., alkylene based, glycerin based, glycidol based, and like surface active agents; cationic surface active agents, e.g., higher alkylamines, quaternary ammonium salts, heterocyclic ring compounds such as pyridine, and the like, phosphoniums or sulfoniums, and the like; anionic surface active agents containing an acid group, e.g., a carboxylic acid, sulfonic acid, phosphoric acid, sulfuric acid ester group, phosphoric acid ester group, and the like; amphoteric surface active agents, e.g., the sulfuric acid or phosphoric acid esters of amino acids, aminosulfonic acids, and aminoalcohols, and the like; etc. A suitable amount of conductive material is about 5% by weight and of an surface active agent is about 0.5 to 1% by weight, each based on the weight of the ferromagnetic material.

Examples of surface active agents usable as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Laid Open (OLS) 1,942,665, British Pat. Nos. B 1,077,317 and 1,198,450, Ryohei Oda, *Kaimen Kassei Zai no Gosei to sono Oyo* (*Synthesis and Applications of Surface Active Agents*), Maki Shoten (1964), J. W. Perry, *Surface Active Agents*, Interscience Publications, Inc. (1958), J. P. Sisley, *Encyclopedia of Surface Active Agents*, Vol. 2, Chemical Publishing Co. (1964), *Kaimen Kassei Zai Binran* (*Handbook of Surface Active Agents*), 6th Ed., Sangyo Tosho K.K., December 20, 1966, etc.

These surface active agents may be used alone or in combination with each other. These surface active agents are used as antistatic agents, and in some cases, for other purposes, e.g., for improving dispersion and magnetic properties and lubricity, or as auxiliary coating agents.

The magnetic recording layer is produced by dissolving the above composition in an organic solvent and coating the resulting coating solution on the non-magnetic support. While not limitative, it is preferred that the amount of solvent used to form any magnetic coating composition be present in an amount of about 15 to about 120% by weight based on the dry weight of the magnetic recording layer to be obtained. Below the lower limit, diffficulties in coating are sometimes encountered, whereas above the upper limit the drying load is very large without any commensurate benefits being achieved.

As matrials for the support, those conventionally used such as polyesters such as polyethylene terephthalate, polyethylene-2,6-naphthalate, and the like, polyolefins such as polypropylene and the like, cellulose derivatives such as cellulose triacetate, cellulose diacetate and the like, plastics such as polycarbonate and the like, non-magnetic metals such as Cu, Al, Zn and the like, ceramics such as glass, porcelain, earthenware, and the like, etc., can be used.

The form of the support may be any of a film, a tape, a sheet, a card, a disc, a drum, and the like, and a suitable material is selected depending on the form to be employed.

With regard to the thickness of the non-magnetic support, such is not limited but in the case of the film, tape, and sheet forms, it is usually about 3 to about 100 $\mu$m, preferably 5 to 50 $\mu$m, and in the case of the disc and card forms, it is usually about 0.5 to about 10 mm, and in the case of the drum form, it is cylindrical and selected depending on the kind of recorder to be used.

In the case of the film, tape, sheet, thin flexible disc, and like supports, the opposite side of the magnetic layer may be backcoated to prevent charging, transfer, and wow and flutter, etc., if desired.

Such a backcoating is described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, 3,761,311, etc.

The ferromagnetic powder and the above described binder and solvent and, if desired, the optional dispersing agent, lubricant, abrasive, antistatic agent, and the like are kneaded to form a magnetic coating composition.

In effecting this kneading, the ferromagnetic powder and all of the above components may be charged to a mixer at the same time, or they may be added succesively. For instance, the ferromagnetic powder can be first added to a solvent and kneaded for a predetermined period, and then other components added and kneaded to form a magnetic coating composition.

For kneading and mixing, various conventional devices can be used. For instance, a two-roll mill, three-roll mill, ball mill, pebble mill, trommel, sand grinder, Szegvari attritor, high speed impeller dispersing machine, high speed stone mill, high speed impulse mill, disperser, kneader, high speed mixer, homogenizer, supersonic dispersing machine, and the like can be used.

Techniques of this kneading and dispersion are described in T. C. Patton, *Paint Flow and Pigment Dispersion*, John Wiley & Sons (1964), and also in U.S. Pat. Nos. 2,581,414 and 2,855,156.

As methods of coating the above magnetic recording layer on the support, conventional air doctor coating, blade coating, air knife coating, squeeze coating, dip coating, reverse roll coating, transfer roll coating, gravure coating, kiss coating, cast coating, spray coating, and the like can be used. Of course, it is possible to use other methods. These methods are described in detail in *Coating Kogaku*, published by Asakura Shoten, March 20, 1971.

The magnetic recording member of the present invention is produced by repeating the step of coating the magnetic layer on the non-magnetic support by the above coating method followed by drying. Thus, at least two layers are provided on the support. Moreover, it is possible to provide two or more magnetic layers at the same time by employing the multi-layer simultaneous coating method as described in Japanese Pat. (Laid Open) Nos. 98803/1973 (West German Pat. (OLS) No. 2,309,159), 99233/1973 (West German Patent Publication (ALS) No. 2,309,158), etc.

The organic solvents which can be used in coating are conventional and include ketones such as acetone, methyl ethyl ketone, methyl isobutyl ketone, cyclohexane, and the like; alcohols such as methanol, ethanol, propanol, butanol, and the like; esters such as methyl acetate, ethyl acetate, butyl acetate, ethyl butyrate, acetic acid glycol monoethyl ether, and the like; glycol ethers such as ether, glycol dimethyl ether, glycol monoethyl ether, dioxane, and the like; aromatic hydrocarbons such as benzene, toluene, xylene, and the like; chlorinated hydrocarbons such as methylene chloride, ethylene chloride, carbon tetrachloride, chloroform, ethylenechlorohydrin, dichlorobenzene, and the like; etc.

The magnetic layer coating on the support formed by a method as described above is dried after coating.

Drying is conveniently performed at from about 50° to about 120° C (preferably 80° to 100° C), with a drying time of about 3 to about 10 minutes, using a hot air stream in an amount of about 20 kl/m$^2$/sec to about 30 kl/m$^2$/sec.

If desired, the ferromagnetic powder in the magnetic layer can be oriented in a conventional manner as disclosed in U.S. Pat. Nos. 1,949,840, 2,796,359, 3,001,891, 3,172,776, 3,426,949, 3,473,960 and 3,681,138; Japanese Patent Publications Nos. 3427/57, 28368/64, 23624/65, 23625/65, 13181/66, 13043/73 and 39722/73.

In the orienting of the magnetic layer, the orienting magnetic field can be either an AC or DC magnetic field, and usually a field strength of about 500 to 2,000 gauss is used. In theory, it is not necessary to orient the magnetic tape. However, to obtain most improved characteristics, orientation is necessary, and, for commercially available tapes, orientation is a standard procedure. The ferromagnetic materials of the present invention are oriented to excellent effect using conditions as are conventional in the art.

Further, the magnetic layer can be subjected to surface-smoothing or cut to the desired shape, to thereby form a magnetic recording medium in accordance with this invention. Suitable surface-smoothing techniques are disclosed in U.S. Pat. Nos. 2,688,567, 2,998,325 and 3,783,023 and German Patent Application (OLS) 2,405,222.

In surface-smoothing the magnetic layer, preferably a calendering method is used in which the magnetic layer is passed between a metal roll and a non-metallic roll while the magnetic layer is heated under pressure. A combination of a metal roll and a roll made of cotton and a combination of a metal roll and a roll made of a synthetic resin are especially preferred. The pressure used in this treatment is conveniently about 25 to about 500 Kg/cm, and the surface temperature of the metal roll is kept at about 35° to about 150° C using a rate of treatment of about 5 to 120 meters/min. When the pressure and temperature are below the lower limits of the above specified ranges, the effect of the surface-smoothing treatment is difficult to achieve, while pressures and temperatures higher than the upper limits of the above specified ranges are not preferred because the support of the magnetic recording material may be deformed. When the treating rate is less than about 5 meters/min, the operating efficiency is low, while if the rate is above about 120 meters/min precise control is needed.

The direction of orientation of the magnetic member is determined by the use thereof. That is to say, in the case of sound, miniature video, and memory tapes, the direction of orientation is parallel to the lengthwise direction thereof, and in the case of video tape for broadcasting, it is applied at an angle of 30° to 90° relative to the lengthwise direction thereof.

Furthermore, as described in West German Patent Publication (ALS) No. 1,190,985, the orientation of the upper and lower layers may be conducted in different directions.

The magnetic recording member of the present invention has the following effects and advantages.

(1) The magnetic recording member can be used under the conditions that the bias and equalization can be set at the normal, standard, and low noise positions.

(2) The magnetic recording member is of low head demagnetization and low distortion.

(3) The magnetic recording member has a high MOL (maximum out-put with no distortion, maximum out-put level).

(4) The magnetic recording member causes lower head abrasion than $CrO_2$.

(5) The magnetic recording member is usable in recording and reproduction in the broad frequency zone from low frequencies to high frequencies.

(6) The magnetic recording member is usable in recording and reproduction at high levels.

The above effects and advantages are marked when ¼ inch open reel tapes, 3.81 mm wide Phillips type tapes, and the like are used.

Hereinbelow, the present invention will be illustrated in more detail by several examples. It is to be understood that various changes in the components, ratios, sequence of operations, and the like may be made by those skilled in the art within the principle and scope of the present invention as defined in the appended claims.

Thus the present invention is not limited to the following examples. All parts are by weight unless otherwise indicated.

| Comparison Example 1 | |
|---|---|
| Single layer Magnetic Recording Member | |
| Ingredients | Parts |
| Ferromagnetic Powder (see Table 2) | 100 |
| Vinyl Chloride-Vinylidene Chloride Copolymer (Vinyl Chloride/Vinylidene Chloride = 87/13 mol%; Degree of Polymerization: 400) | 20 |
| Methylacrylate-Acrylonitrile Copolymer (Molecular weight about 20,000 – 40,000; Copolymerization Ratio: 6:4, molar) | 15 |
| Dibutyl Phthalate | 2 |
| Lecithin | 1.5 |
| Carbon Black (Average Particle Size: 40 μm) | 0.5 |
| Butyl Acetate | 250 |

The above ingredients were mixed and dispersed to produce a magnetic coating composition. This coating composition was coated on a 12 μm thick polyethylene terephthalate support so as to provide a dry thickness of 6 μm. After drying, the member was subjected to surface smoothening, cut to about 3.81 mm width, and placed in a Phillips type tape cassette. The ferromagnetic powder and the properties thereof are shown in Table 2 and the magnetic properties measured are shown in Table 3.

Table 2

| Sample No. | Ferromagnetic Fine Powder | Average Particle Length (μm) | APP Value | Coercive Force Hc (Oe) | Thickness of Magnetic Layer (μm) |
|---|---|---|---|---|---|
| 1 | $\gamma$-$Fe_2O_3$ | 0.8 | 5 | 310 | 6.0 |
| 2 | $CrO_2$ | 0.9 to 1.0 | 0.1 | 480 | 6.0 |
| 3 | Co (1 atomic %) containing | 0.8 | 0.2 | 380 | 6.0 |

Table 2-continued

| Sample No. | Ferromagnetic Fine Powder | Average Particle Length (μm) | APP Value | Coercive Force Hc (Oe) | Thickness of Magnetic Layer (μm) |
|---|---|---|---|---|---|
| | γ-Fe₂O₃ | | | | |

Table 3

| | Electromagnetic Conversion Properties*¹ | | | | |
|---|---|---|---|---|---|
| Sample No. | Operating Bias (%) | Sensitivity (dB) | Demagnetization (dB) | Distortion (%) | MOL (dB) |
| 1 | 100 | 0 | 2.8 | 3.2 | 0.5 |
| 2 | 160 | −2.5 | 1.0 | 1.4 | 3.3 |
| 3 | 120 | −0.5 | 2.3 | 2.6 | 3.8 |

*¹Measured by Standard Specification MTS-102 of the Magnetic Tape Industrial Association, "Test for Video Cassette Tape."
Operating Bias (%): Measured at 4,000 Hz.
Sensitivity (dB): Measured at 333 Hz.
Demagnetization (dB): Reduction in output against the initial signal output at a frequency of 10 KHz and a recording wavelength of 4.75 μm after running 100 times.
Distortion (%): Measured at 333 Hz.
MOL (dB): Output level at the time when the distortion ratio at 333 Hz reaches 5%.

EXAMPLE 1

| Ingredients | Parts |
|---|---|
| Ferromagnetic Powder (see Table 4) | 100 |
| Vinyl Chloride-Vinylidene Chloride Copolymer (Vinyl Chloride/Vinylidene Chloride = 87/13 mol%; degree of polymerization: 400) | 20 |
| Polyester-polyurethane (molecular weight: about 30,000; reaction product of a polyester comprising adipic acid, diethylene glycol, butanediol, and diphenylmethane diisocyanate) | 10 |
| Triisocyanate Compound (75 wt% ethyl acetate solution of the reaction product of 3 moles of toluene diisocyanate and 1 mole of trimethylolpropane; Trade Name: Desmodur L-75; produced by Bayer A.G.) | 5 |
| Dibutyl Phthalate | 2 |
| Lecithin | 2 |
| Butyl Acetate | 250 |

These ingredients were mixed and dispersed to produce a coating composition for the lower layer. This coating composition was coated on a 12 μm thick polyethylene terephthalate so as to provide a dry thickness of 4.5 μm and then dried.

| Ingredients | Parts |
|---|---|
| Ferromagnetic Powder (see Table 4) | 100 |
| Vinyl Chloride-Vinylidene Chloride Copolymer (Vinyl Chloride/Vinylidene Chloride = 87/13 mol%; degree of polymerization: 400) | 20 |
| Methylacrylate-Acrylonitrile Copolymer (Molecular weight; about 20,000 to 40,000; copolymerization ratio: 6:4, molar) | 15 |
| Dibutyl Phthalate | 2 |
| Lecithine | 1.5 |
| Carbon Black | 0.5 |
| (average particle size: 40 μm) | |
| Butyl Acetate | 250 |

These ingredients were mixed and dispersed to form a coating composition for the upper layer. This coating solution was coated on the lower magnetic layer prepared above so as to provide a dry thickness of 1.5 μm and then dried. The thus obtained member was subjected to surface smoothening treatment by super calendering at 200 kg/cm² and 90° C at a pass rate of 50 m/min., cut to about a 3.8 mm width, and placed in a Phillips type tape cassette. The ferromagnetic powder and the properties thereof are shown in Table 4, and the magnetic properties measured are shown in Table 5.

Table 4

| Sample No. | | Ferromagnetic Fine Powder | Average Particle Length (μm) | APP Value | Coercive Force Hc (Oe) | Thickness of Magnetic Layer (μm) |
|---|---|---|---|---|---|---|
| 4 | Upper Layer | γ-Fe₂O₃ | 0.5 | 0.8 | 330 | 1.5 |
| | Lower Layer | γ-Fe₂O₃ | 0.8 | 8 | 280 | 4.5 |
| 5 | Upper Layer | Co (1.5 atomic 0.4%)containing γ-Fe₂O₃ | 0.4 | 0.3 | 400 | 1.5 |
| | Lower Layer | γ-Fe₂O₃ | 0.8 | 8 | 280 | 4.5 |
| 6 | Upper Layer | γ-Fe₂O₃ | 0.4 | 0.5 | 350 | 1.5 |
| | Lower Layer | γ-Fe₂O₃ | 0.8 | 8 | 280 | 4.5 |
| 7 | Upper Layer | γ-Fe₂O₃ | 0.5 | 0.3 | 310 | 1.5 |
| | Lower Layer | γ-Fe₂O₃ | 0.8 | 8 | 280 | 4.5 |
| 8 | Upper Layer | γ-Fe₂O₃ | 0.5 | 0.8 | 300 | 1.5 |
| | Lower Layer | γ-Fe₂O₃ | 0.8 | 8 | 280 | 4.5 |

Table 5

| | Electromagnetic Conversion Properties | | | | |
|---|---|---|---|---|---|
| Sample No. | Operating Bias (%) | Sensitivity (dB) | Damagnetization (dB) | Distortion (%) | MOL (dB) |
| 4 | 95 | 3.2 | −0.62 | 0.5 | 4.5 |
| 5 | 118 | 3.6 | −0.35 | 0.42 | 5.5 |
| 6 | 102 | 3.5 | −0.45 | 0.4 | 5.3 |
| 7 | 87 | 3.0 | −0.9 | 0.54 | 2.0 |
| 8 | 86 | 2.8 | −1.15 | 0.5 | 1.7 |

Figure 3:
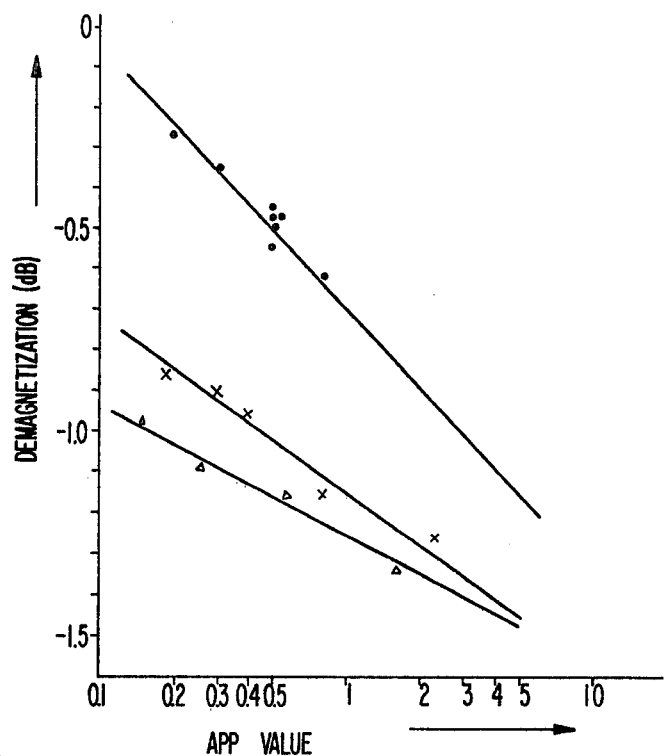
FIG. 3 is a graph showing the relationship between the APP value of a magnetic recording member of the present invention and demagnetization.

It can easily be understood from the above results that the smaller the APP value of the magnetic iron oxide contained in the upper layer, the smaller the demagnetization is, and that if the Hc of the magnetic iron oxide is small even though the APP value is small the demagnetization is high; to facilitate an understanding of this fact, FIG. 3 is presented.

FIG. 3 is a graph showing the relationship between the APP value of the magnetic recording member of the present invention and demagnetization, in which the abscissa indicates the APP value and the ordinate indicates the demagnetization (dB).

EXAMPLE 2

A magnetic tape was produced using magnetic coating compositions having the same composition as for Sample No. 6 of Example 1. The dry thicknesses of the upper layer and the lower layer (total thickness, 6 μm), and the ferromagnetic powders used are shown in Table 6, and the electromagnetic conversion properties are shown in Table 7.

Table 6

| Sample No. | Ferromagnetic Fine Powder | | Average Particle Length (μm) | APP Value | Coercive Force Hc (Oe) | Thickness of Magnetic Layer (μm) |
|---|---|---|---|---|---|---|
| 9 | Upper Layer | γ-Fe₂O₃ | 0.4 | 0.5 | 350 | 0.5 |
|   | Lower Layer | γ-Fe₂O₃ | 0.8 | 8 | 280 | 5.5 |
| 10 | Upper Layer | γ-Fe₂O₃ | 0.4 | 0.5 | 350 | 1.0 |
|   | Lower Layer | γ-Fe₂O₃ | 0.8 | 8 | 280 | 5.0 |
| 6 | Upper Layer | γ-Fe₂O₃ | 0.4 | 0.5 | 350 | 1.5 |
|   | Lower Layer | γ-Fe₂O₃ | 0.8 | 8 | 280 | 4.5 |
| 11 | Upper Layer | γ-Fe₂O₃ | 0.4 | 0.5 | 350 | 2.0 |
|   | Lower Layer | γ-Fe₂O₃ | 0.8 | 8 | 280 | 4.0 |
| 12 | Upper Layer | γ-Fe₂O₃ | 0.4 | 0.5 | 350 | 2.5 |
|   | Lower Layer | γ-Fe₂O₃ | 0.8 | 8 | 280 | 3.5 |
| 13 | Upper Layer | γ-Fe₂O₃ | 0.4 | 0.5 | 350 | 3.0 |
|   | Lower Layer | γ-Fe₂O₃ | 0.8 | 8 | 280 | 3.0 |

Table 7

| Sample No. | Electromagnetic Conversion Properties | | | | |
|---|---|---|---|---|---|
|   | Operating Bias (%) | Sensitivity (dB) | Demagnetization (dB) | Distortion (%) | MOL (dB) |
| 9 | 90 | 3.3 | −0.5 | 0.4 | 5.0 |
| 10 | 96 | 3.5 | −0.47 | 0.55 | 5.2 |
| 6 | 102 | 3.5 | −0.45 | 0.4 | 5.3 |
| 11 | 105 | 2.5 | −0.55 | 0.5 | 4.9 |
| 12 | 109 | 1.0 | −0.47 | 0.4 | 4.6 |
| 13 | 112 | 0.5 | −0.6 | 0.6 | 3.0 |

Figure 4:
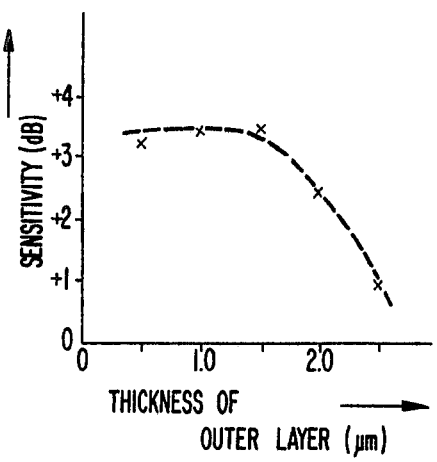
FIG. 4 is a graph showing the relationship between the thickness of the upper layer of a magnetic recording member according to the present invention and sensitivity.

The relationship of the thickness of the upper layer and the output derived from the results of the examples is shown in FIG. 4, and it was found that the most suitable thickness is 0.5 μm to 2.0 μm.

FIG. 4 is a graph showing the relationship between the thickness of the upper layer of the magnetic recording member of the present invention and sensitivity, in which the abscissa indicates the thickness of the upper layer (μm) and the ordinate indicates the sensitivity (dB).

EXAMPLE 3

A magnetic tape was produced using magnetic coating compositions having the same composition as Sample No. 6 of Example 1. In this example, those samples in which the dry thickness of the upper layer was 1.5 μm and the that of the lower layer was changed (see Table 8) were produced. Table 9 shows the electromagnetic conversion properties of these samples.

Table 8

| Sample No. | Ferromagnetic Fine Powder | | Average Particle Length (μm) | APP Value | Coercive Force Hc (Oe) | Thickness of Magnetic Layer (μm) |
|---|---|---|---|---|---|---|
| 14 | Upper Layer | γ-Fe₂O₃ | 0.4 | 0.5 | 350 | 1.5 |
|   | Lower Layer | γ-Fe₂O₃ | 0.8 | 8 | 280 | 3 |
| 6 | Upper Layer | γ-Fe₂O₃ | 0.4 | 0.5 | 350 | 1.5 |
|   | Lower Layer | γ-Fe₂O₃ | 0.8 | 8 | 280 | 4.5 |
| 15 | Upper Layer | γ-Fe₂O₃ | 0.4 | 0.5 | 350 | 1.5 |
|   | Lower Layer | γ-Fe₂O₃ | 0.8 | 8 | 280 | 6 |
| 16 | Upper Layer | γ-Fe₂O₃ | 0.4 | 0.5 | 350 | 1.5 |
|   | Lower Layer | γ-Fe₂O₃ | 0.8 | 8 | 280 | 10 |
| 17 | Upper Layer | γ-Fe₂O₃ | 0.4 | 0.5 | 350 | 1.5 |
|   | Lower Layer | γ-Fe₂O₃ | 0.8 | 8 | 280 | 12 |

Table 9

| Sample No. | Electromagnetic Conversion Properties | | | | |
|---|---|---|---|---|---|
|   | Operating Bias (%) | Sensitivity (dB) | Damagnetization (dB) | Distortion (%) | MOL (dB) |
| 14 | 103 | 3.4 | −0.45 | 0.57 | 5.0 |
| 6 | 102 | 3.5 | −0.45 | 0.4 | 5.3 |
| 15 | 101 | 2.1 | −0.3 | 0.60 | 4.1 |
| 16 | 98 | 1.2 | −0.5 | 0.62 | 3.7 |
| 17 | 98 | 1.0 | −0.65 | 0.75 | 2.4 |

The above results confirm that with increasing the dry thickness of the lower layer, sensitivity tends to decrease and MOL gradually decreases, and thus the most suitable thickness exists, i.e., the thickness of the inner layer is most preferably 3 to 5 μ, even more preferably about 4.5 μ.

EXAMPLE 4

A magnetic tape was produced using the magnetic coating solution of Example 1 and the ferromagnetic fine powder shown in Table 10. The dry thickness of the upper layer was 1.5 μm and that of the lower layer was 4.5 μ. Table 11 shows the electromagnetic conversion properties of the magnetic tape.

Table 10

| Sample No. | Ferromagnetic Fine Powder | | Average Particle Length (μm) | APP Value | Coercive Force Hc (Oe) | Thickness of Magnetic Layer (μm) |
|---|---|---|---|---|---|---|
| 18 | Upper Layer | Co (1.8 atomic %)containing FeO$_x$ X = 1.4 (about 50%) | 0.5 | 0.5 | 540 | 1.5 |
|   | Lower Layer | γ-Fe₂O₃ | 0.8 | 8 | 280 | 4.5 |
| 19 | Upper Layer | Co (1.8 atomic %)containing FeO$_x$ X = 1.4 (about 50%) | 0.5 | 0.5 | 400 | 1.5 |
|   | Lower Layer | γ-Fe₂O₃ | 0.8 | 8 | 280 | 4.5 |
| 20 | Upper Layer | Fe₃O₄ | 0.6 to 0.7 | 0.5 | 400 | 1.5 |
|   | Lower Layer | γ-Fe₂O₃ | 0.8 | 8 | 280 | 4.5 |

Table 10-continued

| Sample No. | Ferromagnetic Fine Powder | | Average Particle Length (μm) | APP Value | Coercive Force Hc (Oe) | Thickness of Magnetic Layer (μm) |
|---|---|---|---|---|---|---|
| 21 | Upper Layer | CrO$_2$ | 0.9 to 1.0 | 0.1 | 480 | 1.5 |
|  | Lower Layer | γ-Fe$_2$O$_3$ | 0.8 | 8 | 280 | 4.5 |

Table 11

| Sample No. | Electromagnetic Conversion Properties | | | | |
|---|---|---|---|---|---|
|  | Operating Bias (%) | Sensitivity (dB) | Demagnetization (dB) | Distortion (%) | MOL (dB) |
| 18 | 130 | 3.2 | −0.45 | 0.4 | 4.0 |
| 19 | 117 | 3.7 | −0.5 | 0.35 | 5.0 |
| 20 | 120 | 3.3 | −0.5 | 0.55 | 3.8 |
| 21 | 135.7 | 2.5 | −0.6 | 0.74 | 4.7 |

Although Sample No. 18 had high bias and properties corresponding to Sample No. 21 in which CrO$_2$ is used for the upper layer, it was not suitable when the conditions for using the magnetic tape of the present invention, i.e., a standard bias of 100% and the provision of equalization, are taken into account. Sample Nos. 19 and 20 have the same Hc, but Sample No. 19 in which Berthollide iron oxide is used is particularly advantageous in that properties such as the squareness ratio and the like are markedly increased.

The multi-layer recording member of the present invention has excellent effects, for instance:

(1) head demagnetization decreases;
(2) operating bias is near the standard (100%);
(3) sensitivity at the low region increases;
(4) MOL increases;
(5) distortion decreases.

Furthermore, the multi-layer recording member of the present invention can be interchangeably used in conventional tape recorders, tape decks, and the like and is characterized by ease of handling. Thus, it has been confirmed that the multilayer recording member has the best quality among the presently used magnetic tapes.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support and upper and lower magnetic layers provided on said non-magnetic support, said magnetic layers comprising a ferromagnetic fine powder and a binder, wherein the uppermost layer of said magnetic layers has a dry thickness of about 0.3 to about 2.5 μm and said ferromagnetic fine powder contained in said uppermost layer is ferromagnetic iron oxide having an APP value of not more than 1.0 and a coercive force of about 330 to 450 Oe, and the ferromagnetic iron oxide of said upper layer having been heat treated in a gaseous phase under the following conditions to reduce its APP value to said value of not more than about 1.0; a temperature of 350° to 550° C, a pressure of 1 to 1.5 atmosphers and a treating time of 1 to 6 hours; and the lower magnetic layer has a dry thickness of about 3 to about 15 μm with said ferromagnetic fine powder contained in said lower layer being ferromagnetic iron oxide having an APP value of about 5 to about 10 and a coercive force of about 250 to 350 Oe.

2. The magnetic recording medium according to claim 1, wherein the binder is a thermoplastic resin, a thermosetting resin, or a mixture thereof.

3. The magnetic recording medium according to claim 2, wherein the thermoplastic resin has a softening point of not more than about 150° C, an average molecular weight of about 10,000 to about 200,000, and a degree of polymerization of about 200 to about 2,000.

4. The magnetic recording medium according to claim 2, wherein the thermosetting resin has a molecular weight of not more than about 200,000 as the coating solution thereof.

5. The magnetic recording medium according to claim 1, wherein the ferromagnetic iron oxide is selected from the group consisting of maghemite, magnetite, and Berthollide compounds thereof.

6. The magnetic recording medium according to claim 1, wherein the magnetic layer further contains a dispersing agent, a lubricant, an abrasive, or an antistatic agent.

7. The magnetic recording medium of claim 1, wherein the binder of the lower magnetic layer is a thermosetting resin.

* * * * *